United States Patent [19]

Kerslake

[11] Patent Number: 4,860,647
[45] Date of Patent: Aug. 29, 1989

[54] CAN DRAINING IMPLEMENT
[76] Inventor: James L. Kerslake, 4038 Hanna St., Fort Wayne, Ind. 46806
[21] Appl. No.: 195,856
[22] Filed: May 19, 1988
[51] Int. Cl.⁴ .............................................. B30B 7/00
[52] U.S. Cl. ................................... 100/234; D7/105; D8/52; 100/110; 100/116; 100/295; 294/16
[58] Field of Search ............... 100/234, 243, 295, 102, 100/104, 116, 125, 110; 294/16, 29, 28, 32, 12, 6, 8.5; D7/99, 105; D8/52, 56; 99/495, 349

[56] References Cited
U.S. PATENT DOCUMENTS

| | | | |
|---|---|---|---|
| 207,974 | 9/1878 | McConnell | 99/495 X |
| D. 244,118 | 4/1977 | Dick | D7/105 |
| 587,197 | 7/1897 | Gilroy | 99/507 |
| 2,399,834 | 5/1946 | Seltzer | 100/234 X |
| 2,433,815 | 12/1947 | Laforge | 100/243 |
| 2,887,948 | 5/1959 | Kramer et al. | 100/234 |
| 3,991,635 | 11/1976 | Marone | D8/52 |
| 3,995,544 | 12/1976 | Farley | 100/116 |
| 4,355,574 | 10/1982 | Bond et al. | 100/234 |
| 4,582,265 | 4/1986 | Petronelli | 100/234 X |

Primary Examiner—Timothy F. Simone
Attorney, Agent, or Firm—H. Jay Spiegel

[57] ABSTRACT

The present invention relates to an improved can draining implement including two handles pivotably attached together. One handle has a can supporting plate which faces a plunger on the other handle. The plunger has an angled face designed to cause liquid being drained from the can to flow to one side. Furthermore, the plunger has embedded therein a magnet designed to hold the lid of the can after draining has been accomplished.

6 Claims, 1 Drawing Sheet

U.S. Patent    Aug. 29, 1989    4,860,647
FIG. 1
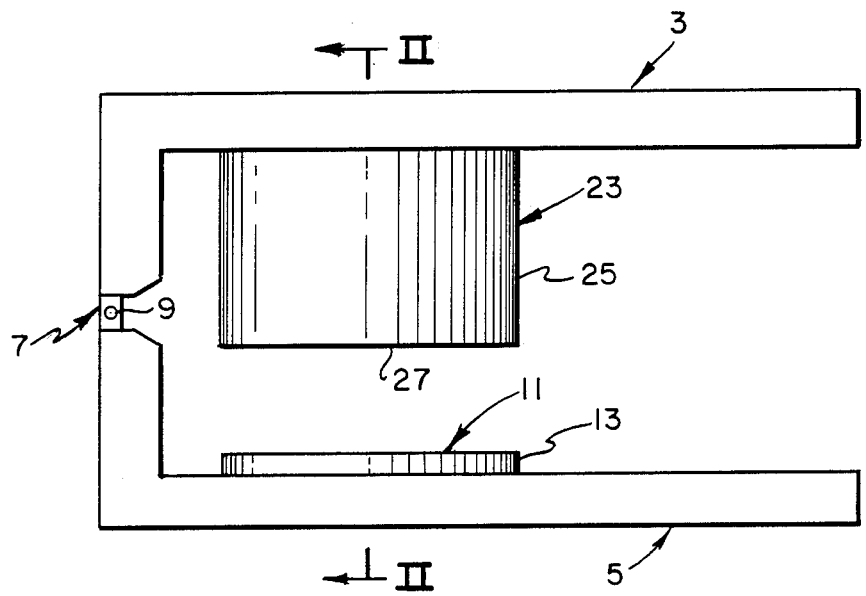
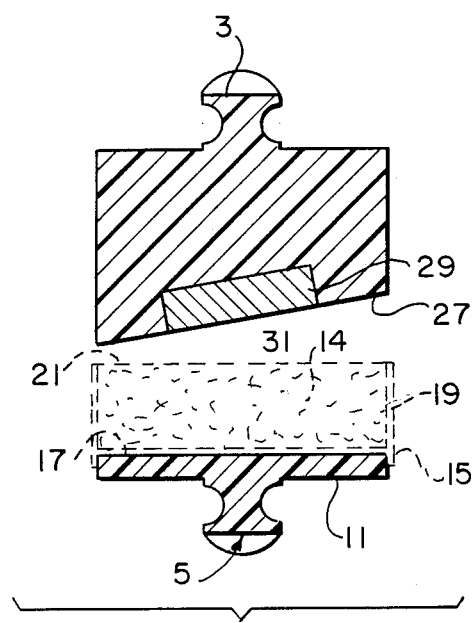
FIG. 2

CAN DRAINING IMPLEMENT

BACKGROUND OF THE INVENTION

The present invention relates to an improved can draining implement. The following prior art is known to applicant:

U.S. Pat. No. 207,974 to McConnell discloses a culinary utensil including two pivotably mounted handles with one handle having a cylindrical body in which a plunger mounted on the other handle reciprocates. The patent discloses use of the device as a vegetable and fruit masher and crusher and for use as a strainer and presser for lard. Of course, these purposes are different from the purposes of the present invention.

U.S. Pat. No. 587,197 to Gilroy teaches a lemon juice extractor having a convex surface aligned with a reciprocating concave surface and whereby a piece of lemon is intended to be placed between these structures whereupon two handles are pivoted with respect to one another to cause lemon juice to be extracted from the lemon. The present invention requires a flat can holding plate which interacts with a laterally angled plunger. Such structure is nowhere taught or suggested by Gilroy.

U.S. Pat. No. 2,786,502 to Turner discloses a kitchen appliance having a plunger reciprocable by virtue of movements of a pivotable handle with respect to a stationary base portion. The present invention is different from the teachings of this patent in many respects including the laterally angled nature of the plunger as well as the small, compact nature of the present invention and the further provision of a magnetic holding means embedded within the plunger.

U.S. Pat. No. 4,582,265 to Petronelli discloses a garlic crusher and/or mincer including two pivotably mounted handles in a chamber therebetween into which garlic or the like is placed so that pivoting of the handles toward one another will cause crushing of the garlic. Of course, this is different from the teachings of the present invention wherein a plate is provided for supporting a can and a plunger with a laterally angled surface is engaged with the can lid which has been circumferentially separated from the can body so that liquid within the can may be drained.

SUMMARY OF THE INVENTION

The present invention overcomes the deficiencies found in the prior art as discussed above and provides a new can draining implement which is inexpensive, easy to use and effective in draining of liquids from a can such as a can containing tuna fish. The present invention includes the following interrelated aspects and features:

(a) In a first aspect, the present invention includes two handles pivotably mounted together at a pivot point. A first of these handles has incorporated therewith a can holding plate which consists of a disc-like structure having a diameter designed to be slightly smaller than the inner diameter of the downwardly depending lip found on most food cans. Thus, the can holding plate is sized to allow the downwardly depending lip of a food can to fit there over and be supported by the can holding plate while being prevented from substantial lateral movements with respect thereto.

(b) The other handle has a downwardly depending plunger which has a face facing the can holding plate which is angled in a direction substantially parallel to the direction of the pivot axis of the handles, with the plunger having embedded therein a magnet, the distal face of which is flush with the laterally angled face thereof.

(c) In the operation of the present invention, a can for which draining is desired is first opened through the use of a can opener as is well known in the prior art, with a circumferential cut being made about the top of the can to sever the lid thereof from the can body. With the lid loosely maintained in its position overlying the contents of the can, the handles of the present invention are pivoted to a position separating them sufficiently to allow the can to be placed on a can holding plate with a downwardly depending annular lip formed below a bottom face of the can fitting over the outer periphery of the can holding plate to thereby securely hold the can in place thereon. In such position, the handles are pivoted with respect to one another so that the face of the plunger facing the can holding plate engages the loosely held lid of the can and pivots it in the direction of the angled nature of the face with the magnet engaging the loose lid. In such position, the can may be inverted over a sink or other container and liquid may be allowed to drain therefrom without the other contents of the can being lost. The angled nature of the downwardly facing face of the plunger allows the liquid to be drained to one side which facilitates better control of the draining process. Thereafter, the inventive implement is oriented in a position whereby the loosely held can lid is directed upwardly, whereupon the handles are separated with the can lid being retained by the magnet and thus being removed from the can. Thereafter, the can may be removed from the implement and its contents may be used.

As such, it is a first object of the present invention to provide an improved can draining implement.

It is a further object of the present invention to provide such an improved can draining implement having a plunger facing a can holding plate with the plunger having an angled surface allowing draining in a predetermined direction.

It is a yet further object of the present invention to provide such a device wherein the plunger has a magnet embedded in the face thereof so that the loosely held can lid may be retained thereby when the draining procedure has been completed.

These and other objects, aspects and features of the present invention will be better understood from the following detailed description of the preferred embodiment when read in conjunction with the appended drawing figures.

BRIEF DESCRIPTION OF THE DRAWINGS

FIG. 1 shows a side view of the present invention.

FIG. 2 shows a cross-sectional view along the line II—II of FIG. 1.

SPECIFIC DESCRIPTION OF THE PREFERRED EMBODIMENT

With reference to the figures, it is seen that the inventive implement is generally designated by the reference numeral 1 and includes handles 3 and 5 pivotably connected at a pivot 7 having a pivot pin 9. As should be understood by those skilled in the art, the pivot 7 includes portions of the respective handles 3 and 5 which interleave with one another and are thereafter connected together by sliding the pin 9 through the interleaved sections.

The handle 5 has incorporated therewith an upwardly facing can holding plate 11 having an outer periphery 13 designed to be slightly smaller in diameter than the inner diameter of a depending lip 15 of a typical can 14 shown in phantom in FIG. 2.

With reference to FIG. 2, it is seen that the can 14 includes the downwardly depending annular lip 15, a bottom 17, side walls 19 and a lid 21 which has been separated from the walls 19 by a cutting tool (not shown).

The upper handle 3 has depending downwardly therefrom a plunger 23 having outer peripheral walls 25 to define a diameter which may be inserted within a typical food can. Furthermore, the plunger 23 has a downwardly facing face 27 which, as best seen in FIG. 2, is angled to one side of the device. This angling of the face 27 is provided so that when the plunger 23 is inserted within the can 14, the tendency will be to pivot the can lid to one side and thereby facilitate the draining of the liquid contents of the can to one side of the can as defined by the direction of the angle of the face 27.

Furthermore, with reference to FIG. 2, it is seen that the face 27 of the plunger 23 has a recess 29 formed therein, in which is mounted a permanent magnet 31. The mounting of the magnet 31 within the recess 29 is by any suitable means such as, for example, suitable adhesive. The magnet 31 is provided so that when the plunger 23 face 27 engages the lid 21 of the can 14, through magnetic attraction, the lid 21 will be retained on the face 27 when the draining operation has been completed.

As seen in FIG. 2, the handles 3 and 5 have cross-sections shaped like an I-beam which adds to the strength and rigidity of the handles 3 and 5. Furthermore, in the preferred embodiment of the present invention, the handles 3, 5 the can holding plate 11 and the plunger 23 are made of plastic whereas the hinge pin 9 may be made of any suitable material such as nylon, metal, etc.

The magnet 31 is a permanent magnet which may, for example, be of the Alnico type.

The plunger 23 and handle 3 may be made as a single piece in a molding operation and, similarly, the can holding plate 11 and handle 5 may be made of a single piece in a molding process. Alternatively, these parts may be made separately and may be attached together to any suitable means such as, for example, adhesive, ultrasonic welding or other means.

In the operation of the present invention, when it is desired to drain the contents of a can such as, for example, the can 14, first, the lid 21 is separated from the can 14 by a circumferentially operating cutting tool (not shown).

Thereafter, with the lid 21 loosely maintained in place overlying the contents of the can 14, the device 1 is provided with the handles 3 and 5 separated sufficiently to allow the can 14 to be placed on the can holding plate 11 with the downwardly depending lip 15 overlying the side walls 13 of the plate 11.

Thereafter, the handles 3 and 5 are pivoted toward one another so that the plunger 23 face 27 engages the lid 21 of the can 14 thereby pivoting the lid 21 in conformance with the angled orientation of the face 27. Simultaneously, the magnet 31 magnetically attracts and engages the lid 21 so that it may be retained thereby after the draining process has been completed.

Thereafter, with the handles 3 and 5 moved toward one another so that the can 14 is securely held therebetween, the implement 1 may be inverted over a basin or other container so that liquid may be easily drained from the can 14. Thereafter, the implement 1 may be returned to the orientation shown in FIG. 1 whereupon the handles 3 and 5 may be separated allowing the can 14 to be removed therefrom with the lid 21 thereof being retained by the magnet 31 for easy removal and disposal. Thereafter, the contents of the can 14 may be removed therefrom and consumed.

As such, an invention has been disclosed in terms of a preferred embodiment thereof which fulfills each and every one of the objects of the invention as set forth hereinabove and provides a new and improved can draining implement which is inexpensive to manufacture, and is easy and effective to use. Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An improved can draining implement, comprising:
   (a) a first handle and a second handle, said handles being pivotably connected together at a hinge member;
   (b) said first handle having a can holding plate thereon having a periphery sized to allow a depending peripheral lip on a can bottom to surround said plate periphery when a can is placed on said plate;
   (c) a plunger on said second handle alignable with said plate, said plunger having a face facing said plate which extends in a first plane angled with respect to a second plane defining the lateral extent of said plate.

2. The invention of claim 1, wherein said plunger has a magnet embedded therein.

3. The invention of claim 2, wherein said magnet has a surface coplanar with said first plane.

4. The invention of claim 1, wherein said implement is made of plastic.

5. The invention of claim 1, wherein said handles have cross-sections of I-beam configuration.

6. The invention of claim 1, wherein said first and second planes define, therebetween, an acute angle.

* * * * *